Figure 3:
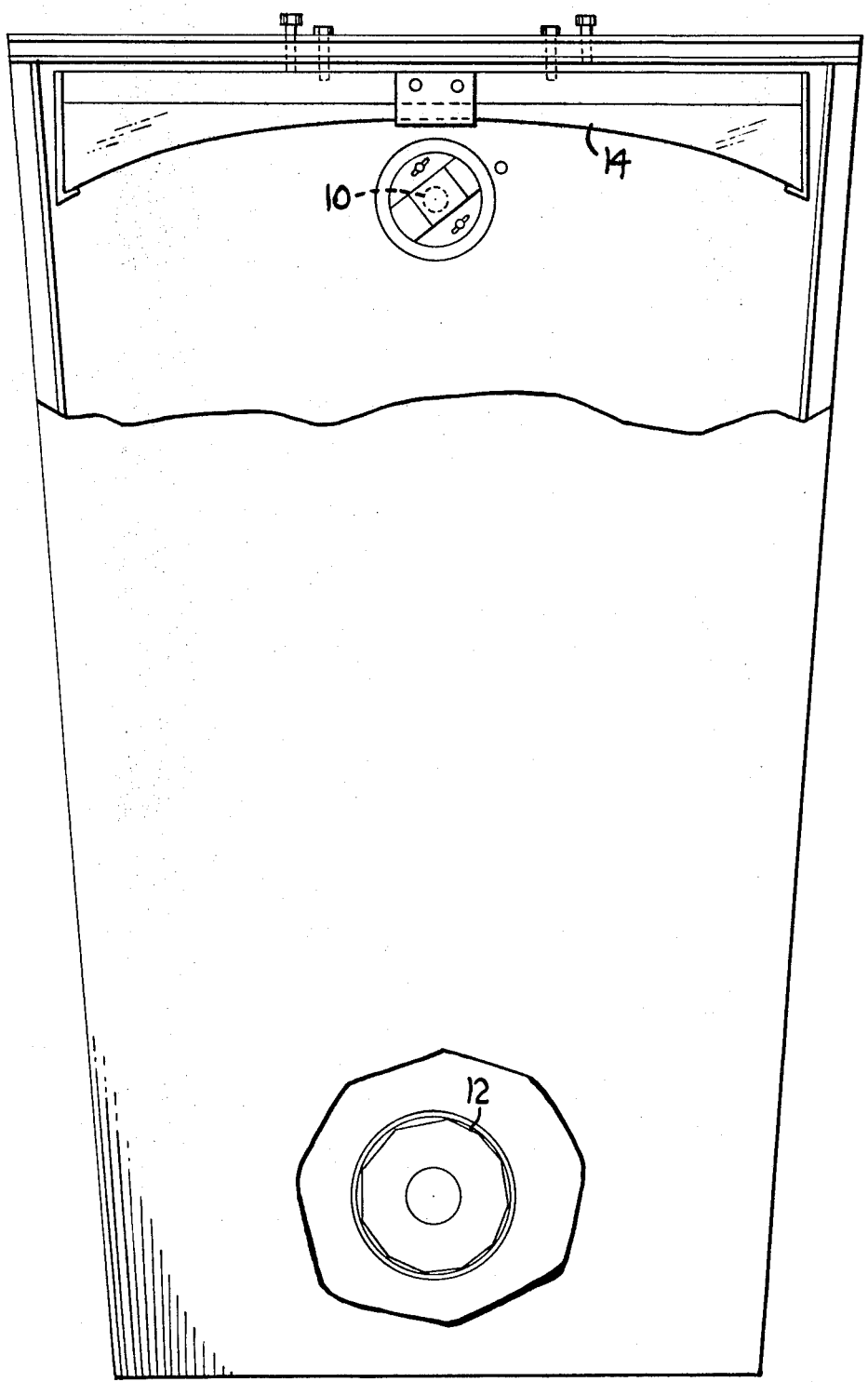

United States Patent

[11] 3,609,380

| [72] | Inventor | Hugh E. Shaw, Jr. |
| | | New Kensington, Pa. |
| [21] | Appl. No. | 779,729 |
| [22] | Filed | Nov. 29, 1968 |
| [45] | Patented | Sept. 28, 1971 |
| [73] | Assignee | PPG Industries, Inc. |
| | | Pittsburgh, Pa. |

[54] RADIATION SENSITIVE DEFECT SCANNER FOR TRANSPARENT MATERIALS
9 Claims, 4 Drawing Figs.

| [52] | U.S. Cl. | 250/219, 356/239, 250/216 |
| [51] | Int. Cl. | G01n 21/32 |
| [50] | Field of Search | 250/219 DF, 236, 216; 356/209–224, 239 |

[56] References Cited
UNITED STATES PATENTS

| 2,769,374 | 11/1956 | Sick | 250/221 |
| 3,359,853 | 12/1967 | Benson et al. | 250/219 X |
| 3,360,654 | 12/1967 | Muller | 250/221 |
| 3,361,025 | 1/1968 | Gaffard | 356/239 |
| 3,370,176 | 2/1968 | Ett et al. | 356/239 |
| 3,458,707 | 7/1969 | Nichols | 250/219 |

*Primary Examiner*—Walter Stolwein
*Attorney*—Chisholm and Spencer

ABSTRACT: A method and apparatus for detecting defects in glass by scanning glass sheets with a beam of highly collimated light to detect defects in the glass interpositioned between a stationary collimated light source and a stationary detection device, as the defects interrupt the light beam.

A collimated light source, a scanning prismatic mirror, and a light responsive detection source comprises the system. A multisided prismatic mirror is interpositioned between the light source and the detection device to provide an effective light path which is longer than the distance between the source and the detector, and scans the glass.

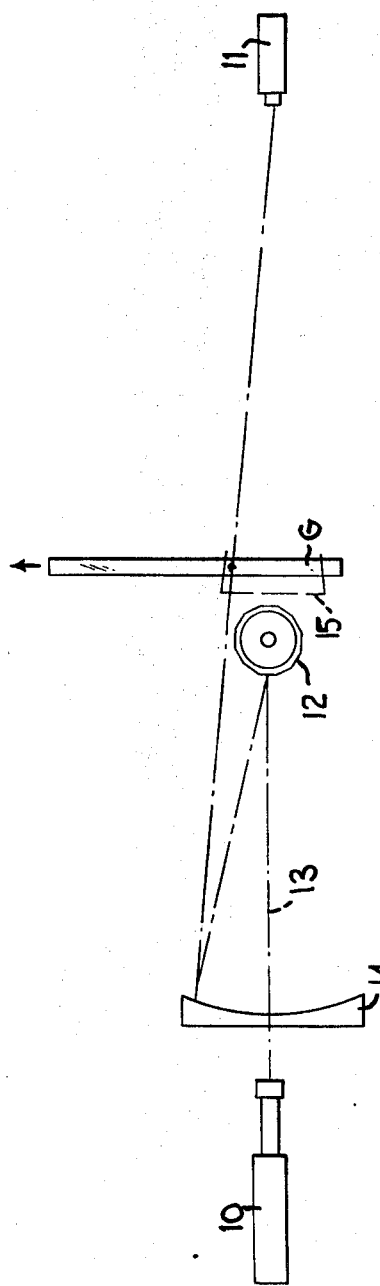
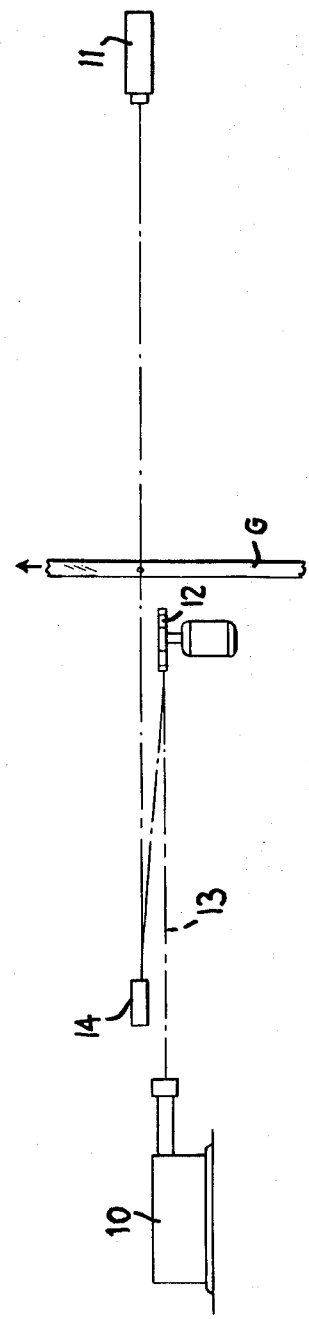

RADIATION SENSITIVE DEFECT SCANNER FOR TRANSPARENT MATERIALS

BACKGROUND OF THE INVENTION

The prior art methods of detecting defects in glass sheets were visual wherein an experienced inspector circled each visible defect with a chalk. A trained glass cutting personnel then made a judgement concerning the best use of the particular sheet of glass. Subsequently, light scanning devices were developed which depended upon the interruption of the light beam for their operation.

The present invention is an improvement on the light beam method wherein highly collimated or closely controlled parallel rays of light are scanned across surfaces of a moving glass ribbon. This invention particularly relates to the use of a collimated light source and an improved method and apparatus for scanning relatively large areas of the moving ribbon as compared with prior art methods and apparatus.

Glass defects are well-characterized and classified. However, they are of such a numerous variety that it has been heretofor not practical to scan a moving ribbon and attempt to detect all visual defects in the ribbon. This invention provides both method and apparatus for scanning a moving ribbon of glass in zones up to 16 inches in width and with the ability to detect the most minute and obscure optical defect in the moving sheet.

Figure 4:
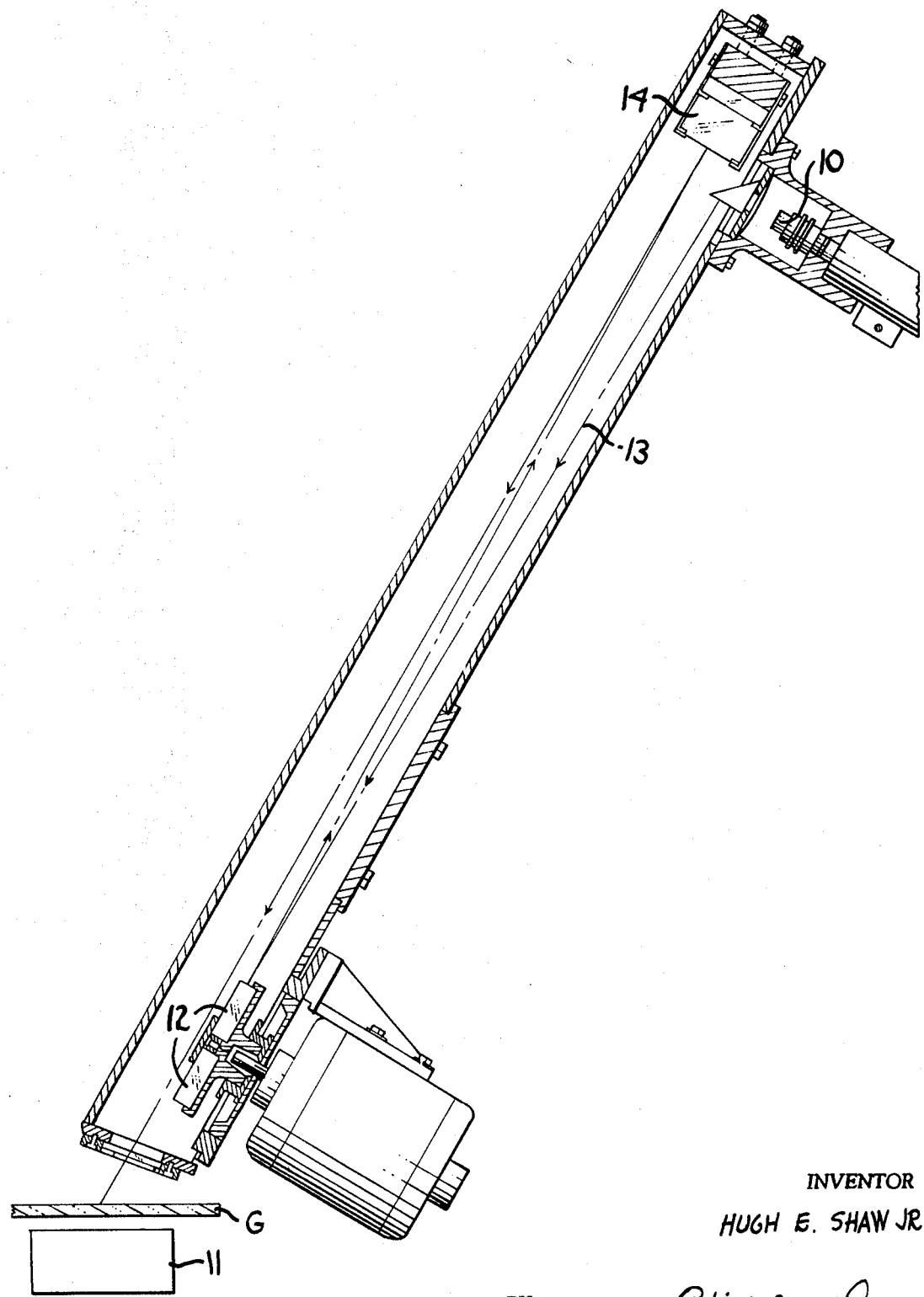

A full and complete understanding of this invention may be had by referring to the description in conjunction with the accompanying drawing wherein:

FIG. 1 is a schematic plan view of the apparatus;
FIG. 2 is a schematic side view of the apparatus;
FIG. 3 is a detailed plan view of the apparatus;
FIG. 4 is a detailed section view of the apparatus of FIG. 1.

A moving ribbon of glass G is positioned on a suitable support permitting the transmission of the light beams. A source 10 of light producing a highly collimated light beam, i.e., one having parallel rays, is positioned adjacent the path of the moving glass ribbon. A suitable light sensitive and responsive photodetector 11 is positioned on the other side of the moving glass ribbon. The light beam is caused to scan over the moving ribbon in this embodiment by a multifaced prismatic mirror 12 positioned between the light source and the moving ribbon. Beams of parallel light rays 13 are directed from the light source 10 to the prismatic mirror 12. The revolving prismatic mirror reflects the light onto a concave mirror section 14 positioned between the light source and the multifaced prismatic mirror, however, without interfering with the path of light from the source to prismatic mirror.

In operation, a beam of light is directed upon the prismatic mirror. A motor mechanism causes the prismatic mirror to revolve about its central axis. The light beam 13 is reflected from the face of the prismatic mirror onto the surface of the contoured mirror 14. As the prismatic mirror revolves, the light beam, in effect, sweeps across the surface of the contoured mirror from one edge to another and is reflected from the surface of the mirror and travels in a straight path to the photodetector. As can be seen by observing FIG. 1, the result of the sweeping light beam across the surface of the contoured mirror is that the light beam sweeps across a segment of the glass ribbon shown in the drawing as that segment 15. This method permits the use of a stationary light source and detection means while providing a light beam which scans a relatively wide area of the moving glass ribbon, which is made possible by the collimated light beam. The detection apparatus is used as an input source for counting and computing devices which are well known in the art.

The method of this invention is practiced as follows. A glass workpiece having defects to be detected is passed along a path of travel. The collimated light is directed against a major surface of the glass. The light beam is swept across a zone of the glass which establishes the sweep of the detecting beam. The light beam is varied in intensity as it is interrupted by various defects in the glass. A light-intensity-detecting device interrupts the light beam after it has passed through the glass. The variation in intensity will then translate to variation in electric voltage, current, or both to further control other devices. The method of this invention comprises directing a beam of collimated light through a glass workpiece, scanning a portion of the surface of the workpiece with collimated light, varying the intensity of the collimated light beam in response to the presence or absence of glass defects, and collecting the collimated beam of varying intensity at a detection point and translating said varying light beam into a varying electrical current or voltage to further control the entire process.

The width of the sweep zone is controlled by the size of the prismatic mirror. A 16 sided prismatic mirror used in conjunction with a mirror having a focal length of approximately 10 feet produces a scanning zone across the glass ribbon of approximately 16 inches. In practice, it has been shown that nine such scanning units are sufficient to completely scan a ribbon of glass drawn from a typical glass float tank, or drawing machine.

APPARATUS

The apparatus is shown in FIGS. 3 and 4. FIG. 3 is a top view and FIG. 4 is a side view of the apparatus. The apparatus consists of three principal subassemblies, the light source 10, the photodetector apparatus 11, and an intermediate prismatic mirror system 12. A beam of light 13 is projected from the collimated light source onto the prismatic mirror 12. The prism has, in this embodiment 16 faces, the distance across each flat being 4 inches ± 1/32 inch. The prismatic mirror is made of optical crown glass. The angular accuracy of the faces is ± 6 minutes of arc. The surface accuracy of the faces is one-half wave of mercury green light. Each face is aluminized and then overcoated with a silicon monoxide. The light beam is then reflected from the face of the prismatic mirror onto the front surface concave spherical mirror 14. The diameter of the mirror in this embodiment equals 24 inches ± 1/16 inch. The radius of the curvature if 48 inches ± 1 percent thereof. The mirror is fabricated from optical crown glass with a surface accuracy of one wave mercury green light over any 4-inch-diameter area. The surface is also aluminized and silicon monoxide overcoated. The light source 10 is positioned at any convenient location relative to the conveyed glass and in this preferred embodiment the light source is positioned above the conveyor, i.e. above the unsupported surface of the glass. The detection apparatus is positioned beneath the glass or beneath the supported surface of the glass. The prismatic mirror and the concave mirror are positioned so that the light beam may travel in an uninterrupted path from the light source to the surface of the prismatic mirror and be then returned to the scanning mirror, as shown in FIG. 1. As shown in FIG. 2, the light source 10, the prismatic mirror 12 and the concave mirror may be positioned on the same side of the conveyed glass so that the light beam is directed in a noninterrupted line from the light source to the prismatic mirror to the concave mirror and then redirected from the surface of the concave mirror through the glass to the detection source. The prismatic mirror is offset from the line of light travel from the concave mirror to the detector.

The major components of the apparatus, that is the light source 10 and the photodetector 11, are in a stationary position relative to the line of glass travel The prismatic mirror 12, by reflecting the light onto the concave mirror, causes the light beam to scan the surface of the mirror and the resulting path of travel of the light through the glass provides a very substantial scanning zone, as shown in FIG. 1. The prismatic mirror is motor driven by a synchronous capacitor motor at 3,600 r.p.m. A very suitable collimated light source is a laser which is directed to the 16-sided mirror positioned at the object plane of the converging mirror. The laser beam scans across the surface of the converging mirror and the mirror brings the beam to focus at a single point on the optical axis of the system. Of course, the photodetector or photomultiplier is positioned at the converging point or image plane of the mirror. The photodetection device senses changes in the intensity of the light beam received at the detector. By positioning the glass conveyor in the system relatively near to the scanning mirror, a large scanning zone can be achieved. Other arrangements of the light source, scanning prism, or prismatic mirror concave mirror, and glass conveyor are contemplated.

In another embodiment the light source is directed through a series of prisms to provide an effective focal length of several feet, yet the actual distance from lens to detector system may be only a matter of a few feet. There is no inherent advantage in using this embodiment unless distances between the apparatus and surrounding objects are limited.

The detection apparatus can be any of a number of photosensitive devices, such as a light-sensitive photocell which responds to varying intensity of the light beam. The detection device may be used as an input device for any number of subsequent operations, such as glass positioning computer determination of the most productive methods of partitioning the sheet about the defects. One of the most advantageous features of this collimated light beam method is that compared with the previous prior art methods, the light beam, in a relatively short interval of glass travel, sweeps over the area of the defect a relatively high number of times. The collimated beam is very small in area when compared with the area of the usual defect present in glass sheets. The scanning speed is fast enough to cover over thousands of defects in a relatively short time. Each diminution of intensity of the light beam causes a drop in electrical potential and triggers a pulse circuit in association with the detector. The triggered pulses are then used as an input signal to any number of devices which are desirable in the subsequent processing of the glass.

LIGHT SOURCE

It is necessary for the maximum definition of the defect characteristics to have the highly collimated light source. The laser source produces a light pulse which is virtually parallel in propogation and may be transmitted over a relatively large distance with little or no diversion from the parallel. The light source of this invention, however, is not necessarily limited to a laser but may be supplied by a point source refracted through a system of lenses to produce a parallel beam.

SCANNING DEVICE

The scanning device is a multifaced prismatic mirror 12 rotatably mounted on a shaft. The shaft is connected to a motor drive. The rotating prismatic mirror of the preferred embodiment has 16 sides or faces. However, other geometric configurations may be utilized depending upon the length of the sweep zone desired.

MIRROR

The concave mirror is mounted at any convenient location relative to the glass conveyor and the scanning device so as to cause the light beam to scan the appropriate area of the glass ribbon.

What is claimed is:

1. A process for detecting defects in glass sheet material, which comprises directing a collimated light beam from a light source toward one side of glass sheet material, scanning a portion of said glass sheet material with said beam, said beam after passing through said material varying in intensity in response to the presence of defects in said material, and impinging said light beam onto a light intensity responsive device located on the other side of said sheet, characterized by the fact that the scanning is carried out by reflecting said beam by prismatic mirror onto a concave surface of a concave mirror and reflecting said beam from said concave mirror so as to transverse a portion of said glass sheet, said light intensity responsive device being located at the converging point of said concave mirror.

2. A process according to claim 1, characterized by the fact that the scanning of the glass sheet is transverse to the movement of the glass sheet as it is conveyed along a path.

3. A process according to claim 1, characterized by the fact that the prismatic mirror is continuously rotated at a substantially constant speed.

4. A process according to claim 1, characterized by the fact that the reflecting surfaces of the prismatic mirror are substantially flat and are covered with silicon monoxide and that the concave mirror is also covered with silicon monoxide.

5. A process according to claim 1, characterized by the fact that the prismatic mirror, the concave mirror and the light source are on one side of the glass sheet material.

6. Apparatus according to claim 3, characterized by the fact that the means for producing the collimated light beam, the prismatic mirror and the concave mirror are positioned on the same side of the glass sheet.

7. Apparatus for detecting defects in an advancing sheet which comprises means for producing a collimated light beam on one side of the glass sheet and a light intensity detection device positioned on the opposite side of said glass sheet to collect said light beam after said beam passes through said glass sheet, characterized by a concave mirror mounted adjacent said glass sheet so as to reflect a beam of light through said glass sheet and a revolving prismatic mirror mounted in relation to said light source so as to reflect the light beam from said light source to said concave mirror and to cause the beam to scan an area of said advancing glass, said light intensity detection device being positioned at the converging point of said concave mirror.

8. Apparatus according to claim 7, characterized by the fact that the means for producing a collimated light beam comprises a laser.

9. Apparatus to claim 7, characterized by the fact that the faces of the prismatic mirror and the surface of the concave mirror are optically flat and coated with silicon monoxide.

PO-1050
(5/69)

UNITED STATES PATENT OFFICE
CERTIFICATE OF CORRECTION

Patent No. 3,609,380      Dated September 28, 1971

Inventor(s) Hugh E. Shaw, Jr.

It is certified that error appears in the above-identified patent and that said Letters Patent are hereby corrected as shown below:

Column 2, line 30, "prism" should read -- prismatic mirror --;
Column 2, line 39, "if" before 48 should read -- is --;
Column 4, line 16, Claim 1, "transverse" should read
    -- traverse --.

Signed and sealed this 16th day of May 1972.

(SEAL)
Attest:

EDWARD M.FLETCHER,JR.          ROBERT GOTTSCHALK
Attesting Officer                Commissioner of Patents